(12) United States Patent
Harnett et al.

(10) Patent No.: US 7,336,511 B2
(45) Date of Patent: Feb. 26, 2008

(54) POWER SUPPLY CONTROL LOOP WITH MULTIPLE LEVELING MODES

(75) Inventors: Sean O. Harnett, Penfield, NY (US);
Mark D. Tracy, Rochester, NY (US);
Jesse N. Klein, West Henrietta, NY (US)

(73) Assignee: MKS Instruments, Inc., Wilmington, MA (US)

(*) Notice: Subject to any disclaimer, the term of this patent is extended or adjusted under 35 U.S.C. 154(b) by 0 days.

(21) Appl. No.: 11/696,569

(22) Filed: Apr. 4, 2007

(65) Prior Publication Data

US 2007/0285956 A1  Dec. 13, 2007

Related U.S. Application Data

(63) Continuation of application No. 10/921,078, filed on Aug. 18, 2004, now Pat. No. 7,206,210.

(60) Provisional application No. 60/495,719, filed on Aug. 18, 2003.

(51) Int. Cl.
*H02M 1/08* (2006.01)
(52) U.S. Cl. .................................. 363/80; 323/285
(58) Field of Classification Search ............... 323/285; 363/74, 78, 79, 80, 95, 97, 98
See application file for complete search history.

(56) References Cited

U.S. PATENT DOCUMENTS

| | | | | |
|---|---|---|---|---|
| 4,527,226 A | * | 7/1985 | Glennon | 363/41 |
| 5,923,158 A | * | 7/1999 | Kurokami et al. | 323/299 |
| 7,206,210 B2 | * | 4/2007 | Harnett et al. | 363/80 |
| 2004/0196678 A1 | * | 10/2004 | Yoshimura et al. | 363/79 |

* cited by examiner

*Primary Examiner*—Jeffrey Sterrett
(74) *Attorney, Agent, or Firm*—Proskauer Rose LLP

(57) ABSTRACT

A method and apparatus for controlling a power supply. The system includes a power supply and a controller for outputting a command signal to regulate the operation of the power supply. The controller determines the command signal based on at least one error signal which is selected from a plurality of error signals based on a selection criterion.

20 Claims, 4 Drawing Sheets

POWER SUPPLY CONTROL LOOP WITH MULTIPLE LEVELING MODES

RELATED APPLICATIONS

This application is a continuation of U.S. application Ser. No. 10/921,078, filed Aug. 18, 2004 now U.S. Pat. No. 7,206,210 which claims the benefit of U.S. Provisional Application No. 60/495,719, filed on Aug. 18, 2003, the entire teachings of the which are incorporated herein by reference.

FIELD OF THE INVENTION

The invention relates to the field of power supply control. In particular, the invention relates to a method and system for controlling a power supply of a plasma chamber.

BACKGROUND OF THE INVENTION

Typically, power supply applications require the power supply to operate within a well defined operating area bounded by various electrical limits (e.g., voltage, current, power, resistance and conductance). Power supply operation is limited to operate within an operating area either to protect the power supply, protect the load or for some desired control effect. Depending upon the application, the power supply may, for example, be required to provide (i.e., level on) a constant power output that does not exceed a specified current limit.

Further, some power supply applications require the power supply to be capable of effectively switching between operating modes (for example, switching from providing a constant power output with current and voltage limits to providing a constant voltage with power and current limits).

A need therefore exists for controlling the operation of a power supply that allows for switching between operating modes of the power supply.

SUMMARY OF THE INVENTION

The invention, in one aspect, relates to a method for controlling the operation of a power supply. The method involves receiving a plurality of error signals associated with operation of a power supply and determining which of the error signals satisfies at least one selection criterion. The method also involves determining properties for a controller based on the error signal that satisfies the at least one selection criterion and controlling the operation of the power supply with the controller.

In some embodiments, some or all of these steps can be repeated. In some embodiments, the method involves receiving a plurality of error signals associated with operation of a power supply and determining which of the error signals satisfies a plurality of selection criterion. In some embodiments, the method involves determining properties for a controller based a plurality of error signals that satisfy the at least one selection criterion.

In some embodiments, the error signals are each based on a power supply operating parameter selected from the group consisting of voltage, current, power, resistance and conductance. In some embodiments, the method involves normalizing the error signals. In some embodiments, normalizing the error signals stabilizes the controller. The error signals can be normalized by, for example, a power supply operating parameter (e.g., one or more of voltage, current, power, resistance and conductance). In some embodiments the controller implements a control algorithm (e.g., proportional plus integral plus derivative, proportional plus integral, proportional plus derivative, state space, fuzzy logic).

In some embodiments, determining which of the error signals satisfies the selection criterion is implemented by at least one of an analog circuit and a digital signal processor.

In some embodiments, the method involves minimizing changes in the error signals. In some embodiments, the minimum error signal satisfies the selection criterion. In other embodiments, the maximum error signal satisfies the selection criterion. In some embodiments, the method involves continuously monitoring the plurality of error signals to determine which error signal satisfies the selection criterion. The method also can involve reducing a value of at least one operating parameter (e.g., voltage, current, power, resistance and conductance) of the power supply if one of the error signals exceeds a specified threshold. The method also can involve delivering power with the power supply to a complex impedance load, for example, a power converter or a plasma chamber. The power supply can be, for example, a DC power supply, an RF power supply or a microwave power supply.

In another aspect, the invention relates to a method for controlling the operation of a power supply which involves determining a first error signal associated with operation of a power supply by comparing a measured value of a first electrical parameter with a specified value of the first electrical parameter and a second error signal associated with operation of the power supply by comparing a measured value of a second electrical parameter with a specified value of the second electrical parameter. The method also involves identifying which of the error signals satisfies a selection criterion and determining properties for a controller based on the error signal that satisfies the selection criterion.

In another aspect, the invention is a system that includes a power supply and a controller for outputting a command signal to regulate the operation of the power supply. The controller determines the command signal based on at least one error signal. The at least one error signal is selected from a plurality of error signals based on a selection criterion.

The controller can be implemented with at least one of an analog circuit and a digital signal processor. The controller can regulate at least one operating parameter (e.g., voltage, current, power, resistance and conductance) of the power supply. The controller can minimize changes in the error signals. The controller can normalize the error signals. The error signals can be normalized with a power supply operating parameter, such as, voltage, current, power, resistance or conductance. Normalizing the error signals can stabilize the controller. The power supply can deliver power to a complex impedance load, such as, a power converter or a plasma chamber. The power supply can be, for example, a DC power supply, an RF power supply or a microwave power supply.

In another aspect, the invention is a system that includes a power supply and a means for determining which of a plurality of error signals satisfies a selection criterion. The system also includes means for determining properties for a controller based on the error signal that satisfies the selection criterion and means for controlling the operation of the power supply with the controller.

The foregoing and other objects, aspects, features, and advantages of the invention will become more apparent from the following description and from the claims.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
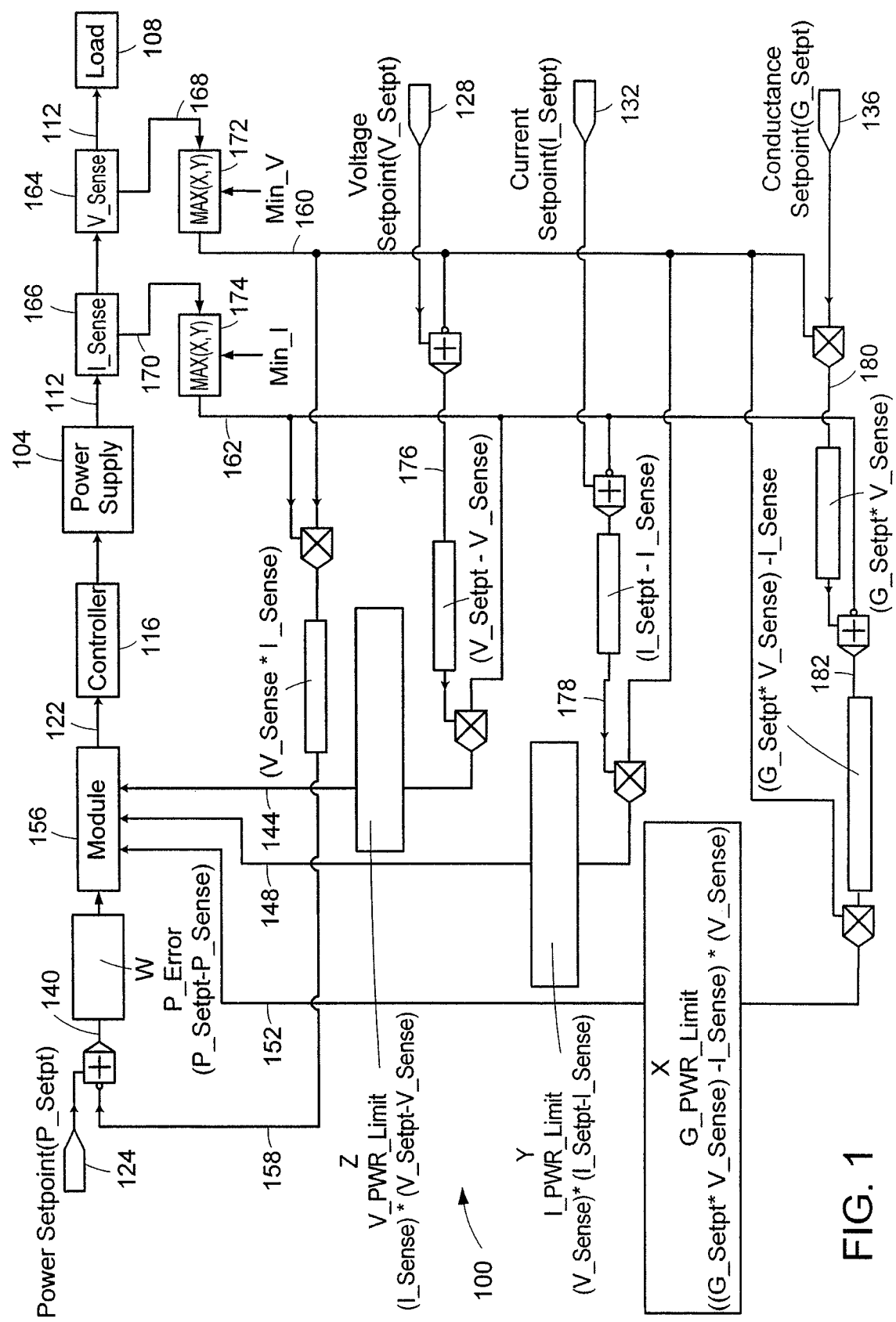
FIG. 1 is a block diagram of a system for controlling the operation of a power supply that embodies the invention.

FIG. 1 depicts a system 100 for use in controlling the operation of an apparatus, such as a power supply 104. The power supply 104 outputs an electrical signal, such as power supply output 112 to an electrical load 108. The load 108 is, for example, a complex impedance load such as a power converter or a plasma chamber. By way of further example, the power supply may be a DC power supply, an RF power supply or a microwave power supply. In some embodiments, the power supply 104 provides the output 112 to a plasma chamber used in a semiconductor sputtering process.

The system 100 also includes a controller 116 that implements a control algorithm. The controller 116 receives an error signal 122. The controller 116 calculates and outputs a control signal 120 based on the error signal 122 to control, in a desired manner, the operation of the power supply 104. Any one of a variety of control algorithms may be implemented by the controller 116, including but not limited to a proportional plus derivative plus integral control algorithm, a proportional plus derivative algorithm, a proportional plus integral algorithm, a state space control algorithm and a fuzzy logic algorithm. In this embodiment, the controller 116 includes digital circuitry, such as a digital signal processor. In some embodiments, the controller 116 receives one or more error signals and calculates and outputs one or more output signals based on the plurality of error signals.

By way of example, the controller 116 may include a Motorola DSP56300 digital signal processor (Motorola, Schaumberg, Ill.). In some embodiments, the controller 116 and other components of the system 100 may be implemented with analog circuitry or a combination of analog and digital circuitry.

In this embodiment, the system 100 includes a set of limits, power setpoint 124, a voltage setpoint 128, a current setpoint 132 and a conductance setpoint 136 which are operating parameters of the power supply 104. The setpoints 124, 128, 132 and 136 are specified limits for each of the operating parameters (power, voltage, current and conductance, respectively). The setpoint values are predefined, maximum values that define an operating area which the power supply 104 operates within to ensure that the power supply 104 and the load 108 are electrically protected. In some embodiments, the setpoints 124, 128, 132 and 136 may be modified by an operator or separate controller, for example, during operation of the system 100.

The system 100 also includes a module 156 that receives as inputs a plurality of error signals 140, 144, 148 and 152 that are associated with operation of the power supply 104. The module 156 selects at least one of the error signals 140, 144, 148 and 152 based on one or more selection criterion and outputs a selected error signal 122 to the controller 116. The controller 116 determines properties for the control algorithm based on the at least one selected error signal 122.

The controller then outputs the control signal 120 to control, in a desired manner, the operation of the power supply 104.

In this embodiment, the module 156 employs a selection criterion that selects the error signal which has the minimum value. A negative error signal is less than a positive error signal. The selected error signal is output to the controller 116 as described previously herein. Alternative and/or multiple selection criteria can be employed. For example, the module 156 can employ a selection criterion that selects the error signal which has the maximum value. In some embodiments, the module 156 can employ a selection criterion that selects the error signal 122 which satisfies a mathematical equation.

In this embodiment, the error signals 140, 144, 148 and 152 are each normalized by appropriate scaling factors such that the error signals each have the same units of measure as an electrical power signal (e.g., watts). As a result, the loop gain for each error signal is approximately equal because each error signal is normalized to have the same units of measure. In this manner, the performance of the controller is stabilized such that, for example, the performance of the system 100 will not vary greatly when switching between operating modes of the system 100. For example, the performance of the system 100 will not vary greatly when the power supply changes from leveling on a maximum power value that is limited by maximum voltage, current and conductance setpoint values to leveling on a maximum voltage value that is limited by maximum power, current and conductance setpoint values. Alternatively, the error signals 140, 144, 148 and 152 can be normalized by an arbitrary parameter such that the error signals have the same units of measure. In some embodiments, the error signals 140, 144, 148 and 152 need not be normalized to achieve satisfactory performance.

Error signal 140 is the difference in magnitude between the power setpoint 124 and a power sense signal 158. The power sense signal 158 is the mathematical product of a voltage signal 160 and a current signal 162. The product of the voltage signal 160 and the current signal 162 has units of power (Power=Voltage*Current). A voltage sensing module 164 measures and outputs a signal 170 corresponding to the voltage of the power supply output 112. In this embodiment, a module 172 compares the voltage signal 168 with a specified minimum voltage (Min_V). The greater of the voltage signal 168 and the minimum voltage (Min_V) is output by the module 172 as voltage signal 160. To ensure the controller 116 is stable minimum voltage (Min_V) is specified to be greater than zero.

Similarly, a current sensing module 166 measures the current of the power supply output 112 and outputs a current signal 170. A module 174 compares the current signal 170 with a specified minimum current (Min_I). The greater of the current signal 170 and the minimum current (Min_I) is output by the module 174 as current signal 162. To ensure the controller 116 is stable, minimum current (Min_I) is specified to be greater than zero.

Error signal 144 is the mathematical product of voltage signal 176 and current signal 162. The mathematical product of the voltage signal 176 and the current signal 162 has units of power (Power=Voltage*Current). Voltage signal 176 is the difference between the value of the voltage setpoint 128 and the voltage signal 160.

Error signal 148 is the mathematical product of current signal 178 and voltage signal 160. The mathematical product of the current signal 178 and the voltage signal 160 has units of power (Power=Current*Voltage). Current signal 178 is the difference between the value of the current setpoint 132 and the current signal 162.

Error signal 152 is the mathematical product of current signal 182 and voltage signal 160. The mathematical product of the current signal 182 and the voltage signal 160 has units of power (Power=Current*Voltage). Current signal 182 is the difference between current signal 180 and current signal 162. Current signal 180 is the mathematical product of the conductance setpoint 136 and the voltage signal 160. Conductance is equal to (1/Resistance) and has units of Mhos.

Typically, the system 100 continuously monitors the plurality of error signals to determine which error signal satisfies the selection criterion. The system 100 can repeat each step of the method of the invention to continuously ensure desirable operation of the power supply 104 and ensure the controller 116 is stable even as the operating mode of the system is changed. By way of example, each step of the method can be repeated to ensure proper operation of the power supply 104 and controller 116 stability when the operating mode of the system 100 is switched from commanding a specified power output limited by current, voltage and conductance setpoints to commanding a specified voltage output limited by power, current and conductance setpoints.

Figure 2:
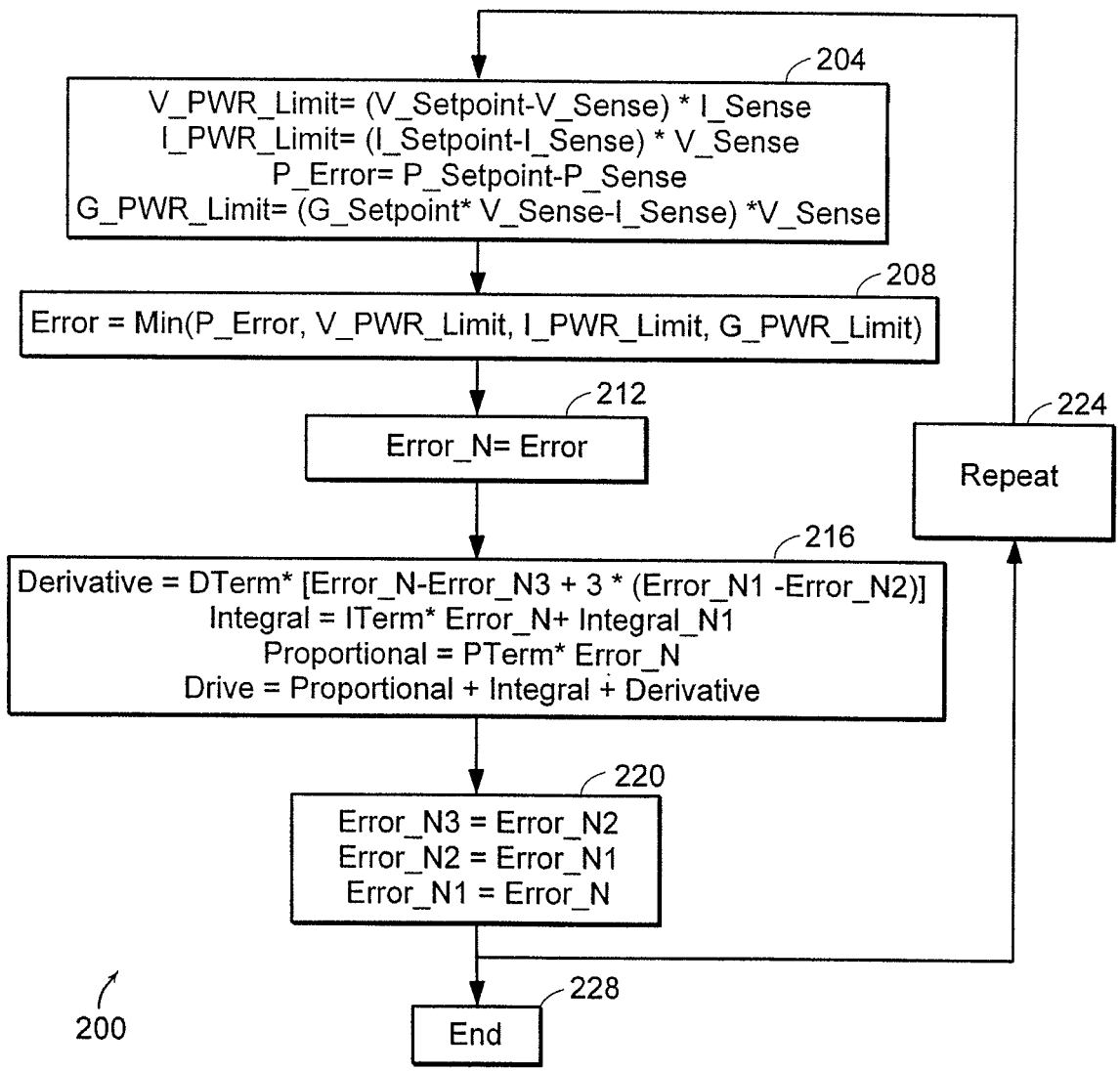
FIG. 2 is a flow diagram of a method for controlling the operation of a power supply, according to an illustrative embodiment of the invention.

FIG. 2 depicts a method for controlling a power supply according to an illustrative embodiment of the invention. The method 200 may be implemented by a power supply control system, such as the system 100 of FIG. 1. The method 200 may be repeated (step 224) or terminated (step 228) by an operator or automatically as dictated by the controller 116. Each repetition of the method 200 is defined as an iteration of the method. In the illustrative method of FIG. 2, four error signals are measured (step 204): V_PWR_Limit, I_PWR_Limit, P_Error and G_PWR_Limit. By way of example, the error signals can be error signals 144, 148, 140 and 152, respectively, of FIG. 1.

The minimum error signal is selected (step 208) of the four error signals (V_PWR_Limit, I_PWR_Limit, P_Error and G_PWR_Limit). In this embodiment, the selection criterion selects the minimum error signal; however, alternative selection criterion may be used in other embodiments.

In step 212, Error_N is assigned a value equal to the minimum error signal selected in step 208. Values for the parameters of a control algorithm in the controller (such as the controller 116 of FIG. 1) are calculated (step 216) by the following equations:

$$\text{Derivative} = DTerm * [\text{Error\_}N - \text{Error\_}N3 + (\text{Error\_}N1 - \text{Error\_}N2)] \qquad \text{EQN. 1}$$

$$\text{Integral} = ITerm * \text{Error\_}N + \text{Integral\_}N1 \qquad \text{EQN. 2}$$

$$\text{Proportional} = PTerm * \text{Error\_}N \qquad \text{EQN. 3}$$

where DTerm, ITerm and PTerm are controller constants for a Proportional plus Integral plus Derivative (PID) control algorithm determined, for example, prior to starting operation of the power supply 104 and controller 116. Error_N1 is equal to the error signal Error_N from the immediate prior iteration of the method 200. Error_N2 is equal to the error signal Error_N1 from the immediate prior iteration of the method 200. Error_N3 is equal to the error signal Error_N2 from the immediate prior iteration of the method 200. At startup of the system, the errors Error_N1, Error_N2 and Error_N3 are zero because step 208 has not yet selected an error (step 208). In other embodiments, an operator may, for example, specify an initial value for some or all of the errors (Error_N1, Error_N2 and Error_N3). Integral_N1 is equal to the value of Integral from the immediate prior iteration of the method 200. At startup of the system, the value of Integral is zero because step 216 has not yet determined a value (step 216). In other embodiments, an operator may, for example, specify an initial value for Integral.

A drive signal, such as the output signal 112 of FIG. 1 is calculated (step 216) with the following equation:

$$\text{Drive} = \text{Proportional} + \text{Integral} + \text{Derivative} \qquad \text{EQN. 4.}$$

The output signal 112 is then delivered to the power supply 104 to control in a desired manner the operation of the power supply 104. Error_N3 is then assigned (incremented) a value equal to Error_N2; Error_N2 is assigned a value equal to Error_N1; and Error_N1 is assigned a value equal to Error_N (step 220). Each step (steps 204, 208, 212, 216 and 220) is then repeated (step 224) or terminated (step 228). In some embodiments, different controller constants DTerm, ITerm and PTerm may be implemented by the controller based on, for example, which error signal is selected as the minimum during a specific iteration of the method 200.

Figure 3:
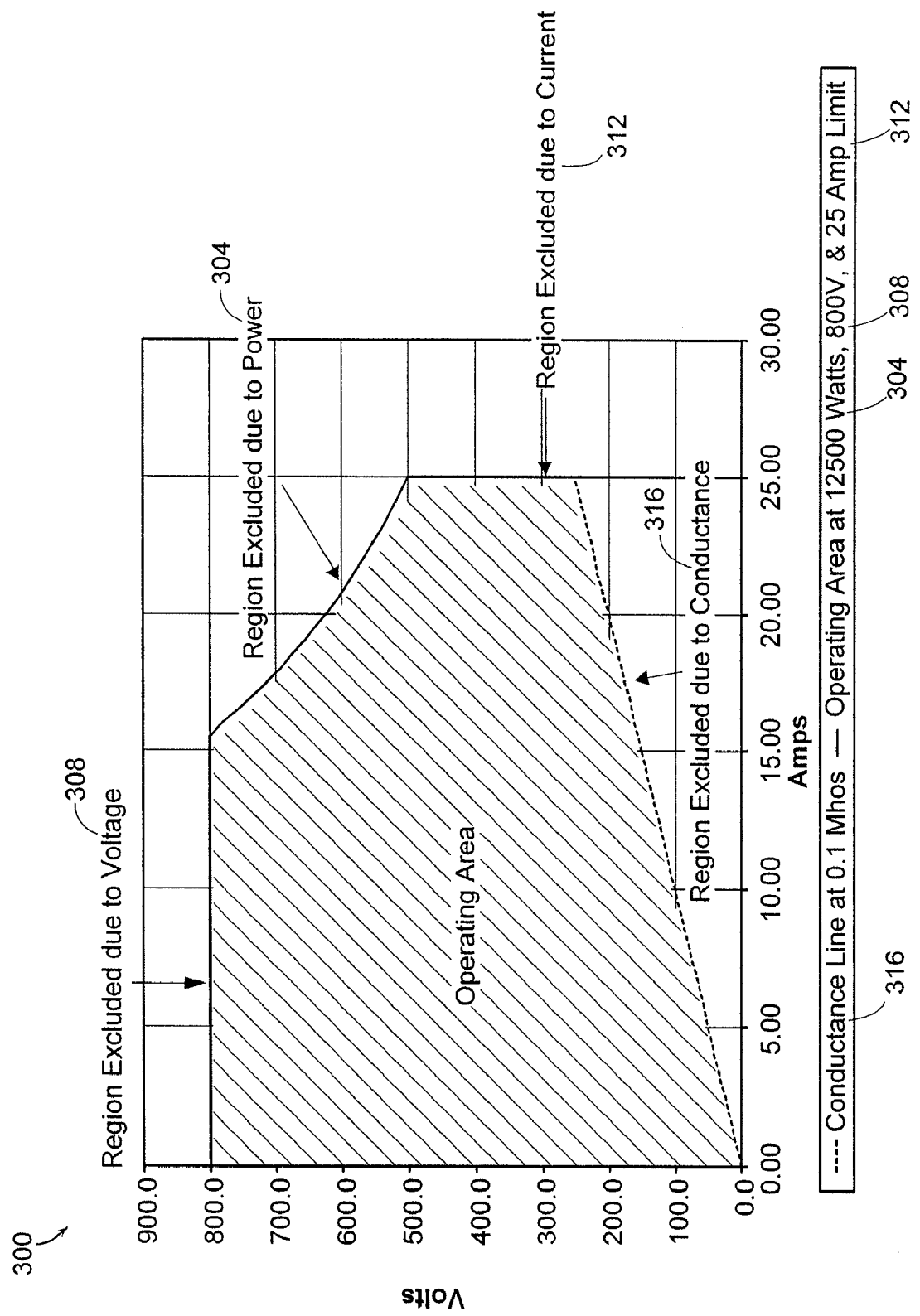
FIG. 3 is a graphical representation of a power supply operating area, using a system for controlling the power supply according to the invention.

By way of illustration, an operating area 302 for a power supply of an embodiment of the invention is illustrated in graphical representation 300 of FIG. 3. In accordance with the invention, a system, such as the system 100 of FIG. 1, regulates the operation of a power supply and specifies setpoints (operating limits 304, 308, 312 and 316) for the power supply operating parameters (power, voltage, current and conductance, respectively). Limit 304 limits the output of the power supply to a maximum power equal to 12,500 watts. Limit 308 limits the output of the power supply to a maximum voltage equal to 800 volts. Limit 312 limits the output of the power supply to a maximum current equal to 25 amps. Limit 316 limits the output of the power supply to a maximum conductance equal to 0.1 Mhos (also referred to as siemens). In this embodiment, the power supply would operate along the perimeter of the operating area 302 (defined by the limits 304, 308, 312 and 316). In other embodiments, a user can set a new operating area and effectively change the perimeter along which the power supply operates. For example, a user can set a new operating area that is within the original operating area by changing one or more of the limits 304, 308, 312 and 316.

As described previously herein, the minimum error signal 122 of the system 100 of FIG. 1 is received by the controller 116. The controller 116 calculates an output signal 120 that is suitable for controlling the output of the power supply 104. In this manner, the minimum error signal 122 is used to regulate the operation of the power supply 104. By way of further example, if the voltage error signal 144 is determined to be the minimum error signal 122, the power supply 104 is operating at a location in the operating area 302 close to the operating limit 308. If instead, the current error signal 148 is determined to be the minimum error signal 122, the power supply 104 is operating at a location in the operating area 302 close to the operating limit 312. In this manner, as the power supply 104 operating location (i.e., dictated by the specific values of power, voltage, current and conductance) changes due to, for example, a change in the electrical properties of the load 108, the system will select the error signal that has the minimum value.

Figure 4:
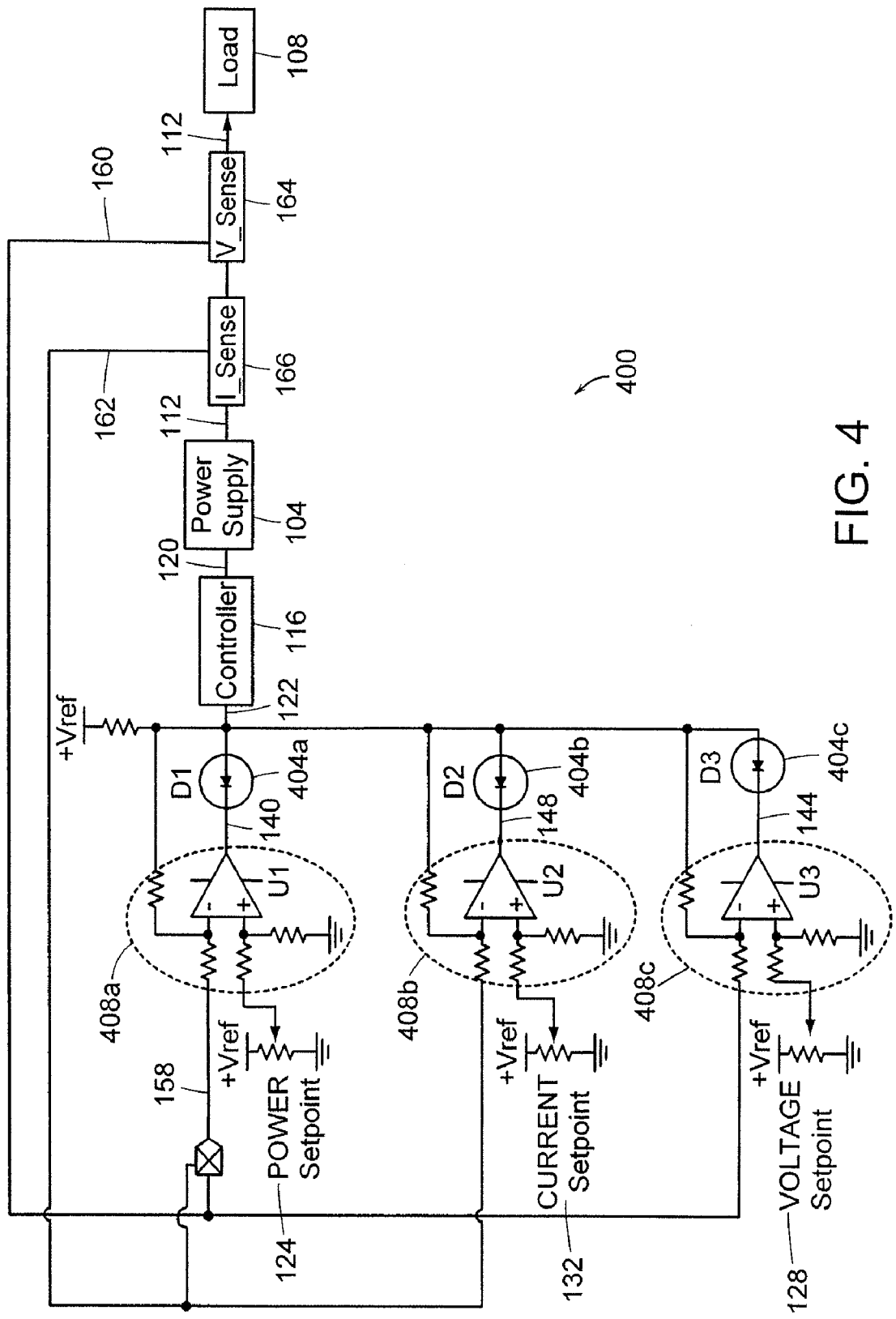
FIG. 4 is a block diagram of a system for controlling the operation of a power supply employing analog circuitry, according to an illustrative embodiment of the invention.

In another embodiment, illustrated in FIG. 4, a system 400 for controlling the operation of the power supply 104 includes analog circuitry for generating the power error signal 140, the voltage error signal 144 and the current error signal 148. Op-amp circuit 408a generates power error signal 140 based on power setpoint 124 and power signal 158. Power signal 158 is the mathematical product of current signal 162 and voltage signal 160, similarly as previously described herein. Op-amp circuit 408b generates current error signal 148 based on current setpoint 132 and current signal 162. Op-amp circuit 408c generates voltage error signal 144 based on voltage setpoint 128 and power signal 160.

In this embodiment, error signals 144 and 148 are not normalized to have units of measure equal to the units of measure of power error signal 140 (e.g., watts). Accordingly, the loop gains of the op-amp circuits are individually adjusted to ensure that the controller 116 is stable during operation of the system 400. In some embodiments, in the absence of normalizing the voltage error signal 144 and the current error signal 148, the controller 116 coefficients (for example, the coefficients DTerm, ITerm and PTerm of a PID controller) are different depending upon which error signal is provided to the controller 116.

Diodes 404a, 404b and 404c are configured such that the minimum error signal (i.e., minimum of errors 140, 144 and 148) is selected and provided to the controller 116. Controller 116 then implements, for example, a PID controller based on the minimum error signal, as described previously herein. Controller 116 then outputs a signal 120 to the power supply 104 which then delivers a power supply output signal 112 to a load, such as a complex impedance load.

By way of illustration, for a load 108 of 1 ohm, with a power supply output 112 of 1 amp at 1 volt, the power output equals 1 watt. With POWER Setpoint equal to 100 W and I_Sense*V_Sense equal to 1 W, the U1 op-amp positive input will dominate, driving the output of U1 (error signal 140) to the positive rail. With a power supply output 112 of 1 volt and VOLTAGE Setpoint equal to 5 volts, the U3 op-amp positive input will dominate, driving the output of U3 (error signal 144) to the positive rail. With a power supply output 112 of 1 amp and CURRENT Setpoint equal to 1 A, the U2 op-amp positive and negative inputs will be equal and the output of the op-amp (error signal 148) will be one diode drop (diode D2) below zero. That results in zero volts at signal 122. Because the minimum error signal is error signal 148, diode D2 (404b) is the only diode that is forward biased, hence the current error 148 will be provided to the controller 116.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for controlling the operation of a power supply, the method comprising:
   (a) receiving a plurality of error signals associated with operation of a power supply;
   (b) determining which of the error signals satisfies at least one selection criterion;
   (c) determining properties for a controller based on the error signal that satisfies the at least one selection criterion, wherein the properties are determined by using a control algorithm selected from a group of control methods comprising state space and fuzzy logic; and
   (d) controlling the operation of the power supply with the controller.

2. The method of claim 1, comprising the step of (e) repeating steps (a), (b), (c) and (d).

3. The method of claim 1, wherein the error signals are each based on a power supply operating parameter selected from the group consisting of voltage, current, power, resistance and conductance.

4. The method of claim 1, comprising normalizing the error signals.

5. The method of claim 4, wherein the error signals are normalized by a power supply operating parameter.

6. The method of claim 5, wherein the power supply operating parameter is selected from the group consisting of voltage, current, power, resistance and conductance.

7. The method of claim 4, wherein the error signals are normalized to stabilize the controller.

8. The method of claim 1, wherein the minimum error signal satisfies the selection criterion.

9. The method of claim 1, wherein the maximum error signal satisfies the selection criterion.

10. The method of claim 1, wherein determining which of the error signals satisfies the selection criterion is implemented by at least one of an analog circuit and a digital signal processor.

11. The method of claim 1, comprising continuously monitoring the plurality of error signals to determine which error signal satisfies the selection criterion.

12. The method of claim 1, comprising reducing a value of at least one operating parameter of the power supply if one of the error signals exceeds a specified threshold.

13. The method of claim 12, wherein the operating parameter is selected from the group consisting of voltage, current, power, resistance and conductance.

14. The method of claim 1, comprising delivering power with the power supply to a complex impedance load.

15. The method of claim 14, wherein the complex impedance load is a power converter.

16. The method of claim 1, wherein the complex impedance load is a plasma chamber.

17. The method of claim 1, wherein the power supply is selected from the group consisting of a DC power supply, RF power supply and microwave supply.

18. A method for controlling the operation of a power supply, the method comprising:
   (a) determining a first error signal associated with operation of a power supply by comparing a measured value of a first electrical parameter with a specified value of the first electrical parameter;
   (b) determining a second error signal associated with operation of the power supply by comparing a measured value of a second electrical parameter with a specified value of the second electrical parameter;
   (c) identifying which of the error signals satisfies a selection criterion; and
   (d) determining properties for a controller based on the error signal that satisfies the selection criterion where the properties are determined by using a control algorithm selected from a group of control methods comprising state space and fuzzy logic.

19. A system, comprising:
   (a) a power supply; and
   (b) a controller for outputting a command signal to regulate the operation of the power supply, the controller determining the command signal on the basis of
      (1) at least one error signal selected from a plurality of error signals based on a selection criterion; and
      (2) a control algorithm selected from a group of control methods comprising state space and fuzzy logic.

20. A system, comprising:
   (a) a power supply;

(b) means for determining which of a plurality of error signals satisfies a selection criterion;
(c) means for determining properties for a controller based on
   (1) the error signal that satisfies the selection criterion and
   (2) a control algorithm selected from a group of control methods comprising state space and fuzzy logic; and
(d) means for controlling the operation of the power supply with the controller.

* * * * *